June 1, 1965  E. H. BALL  3,187,080
TEMPERATURE INDICATING MEANS FOR ELECTRIC CABLES
AND DIFFERENT SECTIONS THEREOF
Filed April 30, 1962

INVENTOR:—
EDMUND HUGH BALL
by Eugene E. Stevens and/or
Raymond H. Stevens
ATTORNEYS United States Patent Office 3,187,080
Patented June 1, 1965

3,187,080
TEMPERATURE INDICATING MEANS FOR ELECTRIC CABLES AND DIFFERENT SECTIONS THEREOF
Edmund Hugh Ball, Southampton, England, assignor to Pirelli General Cable Works Limited, London, England, a British company
Filed Apr. 30, 1962, Ser. No. 191,053
7 Claims. (Cl. 174—11)

This invention relates to electric cables, and in particular to methods and apparatus for checking or indicating temperatures within a cable or within two or more lengths of cable constituting a cable system, particularly in buried power cables, comprising multi-core or single-core electric cables.

The calculation of current ratings for buried power cables requires a knowledge of soil thermal resistivity, which is usually variable at different positions along the route of the cable and is also subject to seasonal variation at any one point of the route. Owing to the difficulty of knowing accurately what the maximum value of thermal resistivity for a particular route will be, it is usually necessary to allow, in fixing the current rating of the cable, a margin for uncertainty, which means that the current rating arrived at may in fact never result in the maximum permissible temperature rise in the cable. The cable may thus be operated at a lower maximum current than it is actually capable of transmitting, and in such circumstances would not therefore be fully utilized. In order to remove this limitation, it is desirable to be able to know when, in a cable or in any cable length along a cable route, the insulation has reached a pre-determined maximum temperature.

Various devices have been proposed for indicating when the temperature of a cable at a certain point reaches a pre-determined maximum value, but the use of the known devices becomes impracticable when it is necessary to provide remote indication of temperature in a cable or in a cable length forming part of a cable route.

The present invention has for its object to provide a means, operative at a distance, of checking that the cable insulation is within its specified working temperature continuously at all points along a cable, and also, in the event of such specified temperature being exceeded in a particular cable length of a number of such lengths connected in a cable route, for enabling that length readily to be located by an indication given at a distance.

According to the invention, in an electric cable there is provided a small-bore tube extending substantially throughout its length, closed at one end and open at the other end and containing a liquid having a boiling point equal to the temperature to which it is desired to limit the cable, the said open end of the tube being connected to a volume-responsive switch operated by liquid expelled from the tube as a result of boiling of such liquid and a detecting device connected to the said switch and responsive, on actuation thereof by the liquid, to indicate abnormal temperature rise in the cable.

In the application of the invention to an electric cable route comprising two or more cable lengths in tandem, it is necessary to provide means whereby the detecting device shall indicate in which of such lengths abnormal temperature rise has occurred. In this case, therefore, there is provided (a) throughout all the cable lengths, except that at one end of the route, referred to below as the far end, an auxiliary twin cable, (b) small-bore tubes embedded respectively in the cable lengths, each tube extending substantially throughout its cable length and being closed at one end and open at the other end and containing a liquid having a boiling point equal to the temperature to which it is desired to limit the cable length in which that tube is situated, (c) volume-responsive switches respectively connected to the conductors of the twin cable and communicating with the open ends of the respective tubes and operated by liquid expelled therefrom as a result of boiling of such liquid and (d) a detecting device connected to the conductors of the twin cable in proximity to the near end, that is the end remote from the far end, of the cable route and selectively responsive to signals received from the volume-responsive switches to indicate abnormal temperature rise in any of the cable lengths.

Conveniently, each of the volume-responsive switches is of a nature such that, under normal temperature conditions, it is open, but, on temperature rise to the boiling point of the liquid, it establishes connection between the conductors of the twin cable, so that current may flow from a source of power connected thereto in order to actuate the detecting device: in the preferred form, this device functions to measure the resistance of the circuit established through the twin cable, the value of this resistance varying according to the point along the cable route at which one of the volume-responsive switches has made connection between the twin conductors and therefore indicating in which of the cable lengths abnormal temperature rise has occurred.

In order that the invention may be clearly understood and readily carried into effect, it will now be described more fully with reference to the accompanying drawing which illustrates, by way of example, one cable route layout in accordance therewith and two forms of cable suitable for the invention. In the drawing.

Figure 1:
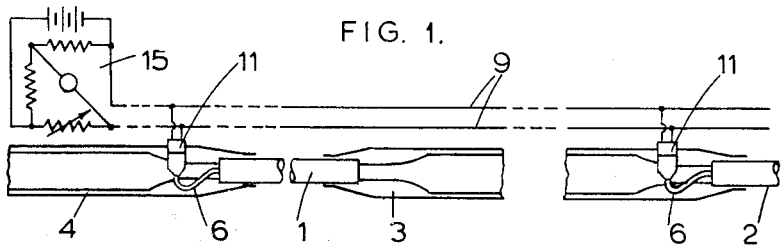
FIGURE 1 shows schematically a cable route.

Referring to FIGURE 1, the entire cable route comprises a number of cable lengths in tandem, two of these, 1 and 2, only being shown as connected by a junction box 3 and the length 1 as starting from a terminal box 4 at what, for convenience, is designated as the *near end* of said cable route.

Figure 2:
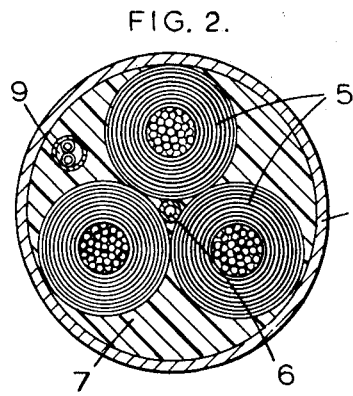
FIGURE 2 illustrates in section a three-core cable modified for use in a cable route such as that of FIGURE 1.
Figure 3:
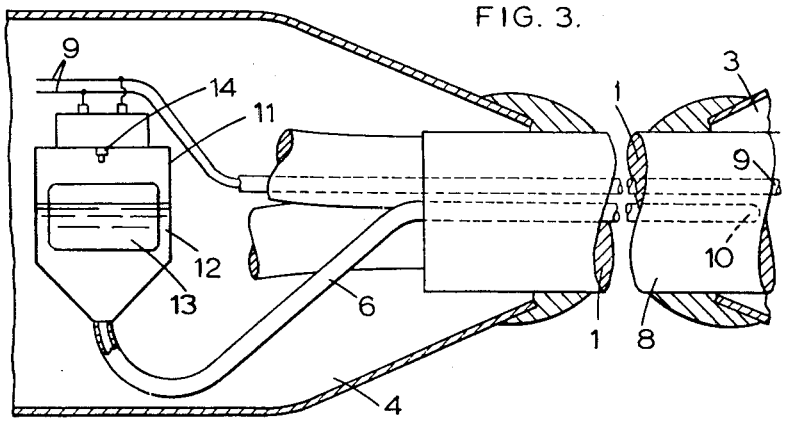
FIGURE 3 depicts in detail the application of the cable seen in FIGURE 2 to the cable route, one of the cores being removed for the sake of clarity.

The three-core cable illustrated in FIGURES 2 and 3 is of ordinary construction, with the addition, between the cores 5, of a small-bore of capillary tube 6 and, located within one of the filler spaces 7 enclosed by the sheath 8, of a length of twin cable 9 which extends throughout the cable route except for the cable length at the far end of the cable route which is remote from terminal box 4. Also, the ends of cable lengths 1 and 2 closest to box 4 are referred to as *near ends* and the other ends as far ends. It is to be observed that, in FIGURE 1, the twin cable 9 has, for the sake of clarity, been shown external to the cable lengths 1 and 2 and the boxes 3 and 4, but it is to be understood that it extends through these elements as is evident from the remaining figures.

The capillary tube 6, of copper, for instance, within each cable length 1 and 2 is closed at its end 10 in proximity to the far end of that length and contains a liquid having a boiling point equal to the temperature to which it is desired to limit the cable length 1; this limit might, however, differ in different lengths, calling for corresponding variation in the liquid employed. A liquid appropriate in many instances is carbon tetrachloride, having a boiling point of 77° C.

The near end of each capillary tube 6 opens into a sealed chamber incorporated in a volume-responsive switch 11 connected across the twin conductors 9, the chamber containing liquid 12, which is the same as that in the tube 6 and supports a float 13. The contact-making member 14 of the switch 11 is normally open, but is closed on rise of the float 13 and then operates to short-circuit the twin conductors 9; this action is brought about by undue rise of temperature in the cable length with which the switch 11 is associated—in the case shown in FIGURE 3, the length 1—causing expulsion of liquid from the tube 6 sufficient to raise the float 13 so as to operate the member 14.

In the example illustrated in FIGURE 1, the detecting device, situated in proximity to the near end of the cable route, is constituted by a Wheatstone bridge 15, of which one arm comprises the twin conductors 9. Normally, of course, the bridge would be unbalanced, but when the conductors 9 are short-circuited, balance may be obtained and the resistance of the lengths of the conductors 9 between the switch 11 at which the short circuit has occurred and the bridge 15 determined, thus giving an indication of the particular cable length in which the temperature has risen abnormally.

Figure 4:
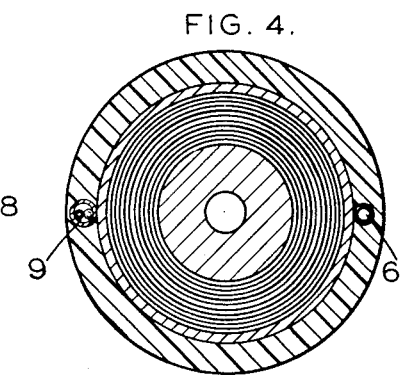
FIGURE 4 is a section of a single-core cable appropriately modified.

As shown in FIGURE 4, the capillary tube 6 and the twin cable 9 may be located in the external cover of jute, polyvinyl chloride or other material; obviously other locations for these elements might be adopted.

If, as may be the case, there is a change of level along a given cable length, the volume-responsive switch would normally be located at the upper end of that length. If the change of level is considerable, a pressure sufficiently above that of the atmosphere will exist at the lower end of the cable length to increase significantly the boiling temperature of the liquid in that region and this, of course, would limit the application of the invention to cable routes in which the change of level over any one length of cable is not too great.

As an alternative to the float switch above described, a diaphragm-operated switch responsive to volume changes may be used. Also it will be understood that, as well as, or instead of, measuring means as above referred to, an alarm arranged, to operate in the control room of the power system may be employed.

While, in the above description, especial prominence has been given to the application of the invention to a cable route comprising two or more cable lengths, its use in a single length of cable will, it is believed, be evident without further description. Clearly, as there is only one volume-responsive switch, an auxiliary twin cable functioning to transmit signals from any one of a number of such switches, is not needed; also it is not necessary that the detecting device shall exercise a measuring function, since no selective action is required.

What I claim and desire to secure by Letters Patent in the United States is:

1. An electric cable route providing a near end and a far end and comprising at least two cable lengths in tandem, said route having (a) an auxiliary twin cable extending throughout all the cable lengths, except that at the far end of the route, (b) small-bore tubes embedded respectively in the cable lengths, each tube extending substantially throughout its cable length and being closed at one end and open at the other end and containing a liquid having a boiling point equal to that of the temperature to which it is desired to limit the cable length in which that tube is situated, (c) volume-responsve switches respectively connected to the conductors of the twin cable and communicating with the open ends of the respective tubes and operated by liquid expelled therefrom as a result of boiling of such liquid and (d) a detecting device connected to the conductors of the twin cable in closest proximity to the near end of said cable route, and arranged on operation of the signals received from the respective volume-responsive switches to indicate abnormal temperature rise in any of the cable lengths.

2. An electric cable route as in claim 1, wherein the liquid in at least one of the small-bore tubes is carbon tetrachloride.

3. An electric cable route as in claim 1, wherein at least one of the volume-responsive switches comprises a sealed chamber into which the tube associated with that switch opens and containing a liquid the same as that in the said tube.

4. An electric cable route as in claim 1, wherein each of the volume-responsive switches is connected across the conductors of the twin cable and is closed when the liquid contained in the small-bore tube associated with the respective switch reaches the boiling point of the liquid.

5. An electric cable route as in claim 4, wherein the detector device is constituted by resistance-measuring apparatus.

6. An electric cable route as in claim 5, wherein the volume-responsive switch associated with the cable length at the near end of said cable route is located in a cable terminal box and those associated with the remaining cable lengths, respectively, are located in junction boxes between those cable lengths.

7. An electric cable route as in claim 1, and a cable terminal box at the near end of said cable route and receiving the volume-responsive switch of the cable length which constitutes the near end of said route, junction boxes carried by said cable route, said junction boxes being disposed between adjacent cable lengths of said cable route and housing the adjacent ends of said cable lengths, each of the junction boxes receiving and housing the volume-responsive switch of one of said cable lengths which is associated with the respective junction box.

References Cited by the Examiner

UNITED STATES PATENTS

| 1,917,129 | 7/33 | Kirch. | |
| 2,004,769 | 6/35 | Shanklin | 174—11 X |
| 2,095,090 | 10/37 | Aime | 174—11 |
| 2,549,645 | 4/51 | Tendall | 200—140 X |

FOREIGN PATENTS

| 375,888 | 7/32 | Great Britain. |

DARRELL L. CLAY, *Acting Primary Examiner.*

JOHN P. WILDMAN, *Examiner.*